(12) United States Patent
Cui et al.

(10) Patent No.: US 12,071,840 B2
(45) Date of Patent: Aug. 27, 2024

(54) ELECTRICALLY-DRIVEN FRACTURING WELL SITE SYSTEM

(71) Applicant: YANTAI JEREH PETROLEUM EQUIPMENT & TECHNOLOGIES CO., LTD., Yantai (CN)

(72) Inventors: Shuzhen Cui, Yantai (CN); Rikui Zhang, Yantai (CN); Sheng Chang, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 45 days.

(21) Appl. No.: 17/703,780

(22) Filed: Mar. 24, 2022

(65) Prior Publication Data
US 2022/0213777 A1 Jul. 7, 2022

Related U.S. Application Data

(63) Continuation of application No. PCT/CN2019/107475, filed on Sep. 24, 2019.

(51) Int. Cl.
*E21B 43/26* (2006.01)
*F02C 6/00* (2006.01)
(Continued)

(52) U.S. Cl.
CPC ............ *E21B 43/2607* (2020.05); *F02C 6/00* (2013.01); *F02C 7/22* (2013.01); *F04D 13/06* (2013.01);
(Continued)

(58) Field of Classification Search
CPC .... F02C 6/00; F02C 7/22; F04D 13/06; F04D 13/14; F04D 29/605; F05D 2220/76; F05D 2260/02; F01D 15/10; B60P 3/00
See application file for complete search history.

(56) References Cited

U.S. PATENT DOCUMENTS 10,865,624 B1 * 12/2020 Cui ..................... E21B 41/0085
2002/0023752 A1 * 2/2002 Qu ......................... E21B 43/26
507/131

(Continued)

FOREIGN PATENT DOCUMENTS

CA 2987665 A1 6/2018
CN 102602322 A 7/2012
(Continued)

OTHER PUBLICATIONS

Written Opinion of the International Searching Authority and International Search Report for PCT Application No. PCT/ CN2019/107475 mailed on Jun. 22, 2020.
(Continued)

*Primary Examiner* — Steven A MacDonald
(74) *Attorney, Agent, or Firm* — Sheppard Mullin Richter & Hampton LLP (57) ABSTRACT

A wellsite system for electrically-driven fracturing may include a power supply system, one or more electrically-driven fracturing systems, one or more electrically-driven sand blenders, a sand supply system, a liquid supply system, and one or more manifolds. The power supply system includes a gas turbine generator set configured to provide power to the one or more electrically-driven fracturing systems and the one or more electrically-driven sand blenders respectively. The sand supply system and the liquid supply system are both connected to input ends of the electrically-driven sand blenders. Output ends of the electrically-driven sand blenders are connected to the electrically-driven fracturing systems through the one or more manifolds. The electrically-driven fracturing systems are connected to a wellhead through the one or more manifolds.

20 Claims, 3 Drawing Sheets

(51) Int. Cl.
*F02C 7/22* (2006.01)
*F04D 13/06* (2006.01)
*F04D 13/14* (2006.01)

(52) U.S. Cl.
CPC .......... *F04D 13/14* (2013.01); *F05D 2220/76* (2013.01)

(56) References Cited

U.S. PATENT DOCUMENTS

| | | | |
|---|---|---|---|
| 2010/0032031 A1* | 2/2010 | Neal | E21B 43/26 166/381 |
| 2010/0109324 A1* | 5/2010 | Ben-David | H02P 9/14 290/8 |
| 2012/0060929 A1* | 3/2012 | Kendrick | E21B 43/26 137/1 |
| 2013/0140031 A1* | 6/2013 | Cohen | E21B 43/26 166/308.1 |
| 2013/0284455 A1* | 10/2013 | Kajaria | E21B 43/26 166/79.1 |
| 2014/0000899 A1* | 1/2014 | Nevison | E21B 43/26 166/308.1 |
| 2014/0096974 A1 | 4/2014 | Coli et al. | |
| 2014/0138079 A1 | 5/2014 | Broussard et al. | |
| 2014/0174717 A1* | 6/2014 | Broussard | E21B 43/2607 166/66.4 |
| 2014/0203760 A1* | 7/2014 | Lammers | B60W 20/00 320/162 |
| 2014/0251623 A1 | 9/2014 | Lestz et al. | |
| 2016/0032703 A1* | 2/2016 | Broussard | E21B 43/2607 166/250.01 |
| 2016/0208592 A1 | 7/2016 | Oehring | |
| 2019/0009232 A1* | 1/2019 | Yeung | B01F 35/2144 |
| 2019/0211661 A1 | 7/2019 | Reckels et al. | |
| 2020/0088202 A1* | 3/2020 | Sigmar | F04D 13/02 |
| 2020/0263498 A1* | 8/2020 | Fischer | F04B 47/02 |
| 2020/0263527 A1* | 8/2020 | Fischer | H02K 7/18 |
| 2020/0263528 A1* | 8/2020 | Fischer | F04B 17/03 |
| 2020/0392826 A1 | 12/2020 | Cui et al. | |
| 2020/0400005 A1 | 12/2020 | Han et al. | |

FOREIGN PATENT DOCUMENTS

| | | |
|---|---|---|
| CN | 103758499 A | 4/2014 |
| CN | 103912259 A | 7/2014 |
| CN | 104153756 A | 11/2014 |
| CN | 204402781 U | 6/2015 |
| CN | 106574495 A | 4/2017 |
| CN | 107159046 A | 9/2017 |
| CN | 107208557 A | 9/2017 |
| CN | 109882144 A | 6/2019 |
| CN | 110118127 A | 8/2019 |
| CN | 110152552 A | 8/2019 |
| CN | 110155193 A | 8/2019 |
| CN | 110201573 A | 9/2019 |
| CN | 110821464 A | 2/2020 |
| CN | 210598946 U | 5/2020 |
| CN | 214887011 U | 11/2021 |
| CN | 113922360 A | 1/2022 |
| CN | 113969774 A | 1/2022 |
| CN | 215719294 U | 2/2022 |

OTHER PUBLICATIONS

Non-Final Office Action for U.S. Appl. No. 16/838,787 mailed on Jun. 2, 2020.
Written Opinion of the International Searching Authority and International Search Report for PCT Application No. PCT/CN2022/113242 mailed on Oct. 10, 2022.
First Search Report for Chinese Application No. 201910904510.4 mailed on Jan. 29, 2024.
First Search for Chinese Application No. 202210451262.4 mailed on Dec. 6, 2022.
Second Office Action for Chinese Application No. 201910904510.4 mailed on May 17, 2024.

* cited by examiner

ELECTRICALLY-DRIVEN FRACTURING WELL SITE SYSTEM

CROSS-REFERENCE TO RELATED APPLICATIONS

This application is a continuation application of International Application No. PCT/CN2019/107475 titled "ELECTRICALLY-DRIVEN FRACTURING WELL SITE SYSTEM" and filed on Sep. 24, 2019. The entire contents of the above-identified application are incorporated herein by reference.

TECHNICAL FIELD

The present invention relates to the technical field of fracturing in oil and gas fields, and specifically to a wellsite system for electrically-driven fracturing.

BACKGROUND

In the working sites of fracturing in oil and gas fields all over the world, the configuration mode for the power transmission system used in conventional fracturing systems is that a diesel engine is connected to a transmission through a transmission shaft to drive the fracturing plunger pump to work. In other words, a diesel engine is used as the power source, a transmission box and a transmission shaft are used as the transmission systems, and a fracturing plunger pump is used as the actuating element. This configuration mode has the following disadvantages: (1) large volume and heavy weight: when a diesel engine drives a transmission box to drive a fracturing plunger pump through a transmission shaft, a large volume is occupied, a heavy weight is involved, the transportation is restricted, and the power density is low. (2) Environmental problems: during operations on a well site, the fracturing system driven by the diesel engine would generate engine waste gas pollution and noise pollution. A noise level exceeding 105 dBA will severely affect the normal life of nearby residents. (3) Cost inefficiency: the fracturing system driven by the diesel engine requires relatively high initial purchase costs and incurs high fuel consumption costs for unit power during operation, and the engine and the transmission also require very high routine maintenance costs. (4) The well site layout covers a large area. Efforts are made globally to manufacture oil and gas exploitation systems with "low energy consumption, low noise level, and low emission." Therefore, the foregoing disadvantages of the conventional fracturing systems that use the diesel engine as the power source impedes the exploitation progress of unconventional oil and gas sources to some extent.

SUMMARY

To address the deficiencies in the existing technologies, an objective of the present disclosure is to provide a wellsite system for electrically-driven fracturing, in which an electrically-driven fracturing system and an electrically-driven sand blender are employed, a gas turbine generator set is used as the power supply system to replace fracturing systems using diesel engine as the power source. The gas turbine generator uses natural gas as the fuel, the sources of which are diverse and not limited, thus better meeting the actual needs of more customers. The gas turbine generator set of the entire wellsite system has a more compact structure and occupies a small area, and the wiring is simple. The electrically-driven fracturing system of the entire wellsite system greatly improves the output power of fracturing system, thus better satisfying the usage requirement. The electrically-driven sand blender of the entire wellsite system compresses the overall size of the sand blender effectively, so that the system transportation and wellsite layout are more flexible and convenient, meanwhile optimizing the configuration of the electric motor and the configuration of power system of the sand blender. Compared with traditional fracturing mode driven by diesel engine, the entire wellsite system may have a lower fuel cost, occupy a smaller area, have a higher power density, a higher output power, and a low noise level.

In various embodiments, the objective of the present disclosure may be achieved by the following technical measures: a wellsite system for electrically-driven fracturing, including a gas source, a power supply system, an electrically-driven fracturing system, an electrically-driven sand blender, a sand supply system, a liquid supply system, an instrumentation system, and a high-low pressure manifold (alternatively referred to as a high-and-low pressure manifold). The power supply system is a gas turbine generator set, the gas source provides fuel for the gas turbine generator set, the gas turbine generator set provides power simultaneously for the electrically-driven fracturing system and the electrically-driven sand blender respectively, the sand supply system and the liquid supply system are both connected to an input end of the electrically-driven sand blender, an output end of the electrically-driven sand blender is connected to the electrically-driven fracturing systems through a high-low pressure manifold, the electrically-driven fracturing system is connected to wellhead through the high-low pressure manifold, and the instrumentation system is used for remote control of the electrically-driven fracturing system and the electrically-driven sand blender.

In some embodiments, the gas turbine generator set may include one gas turbine engine, one generator, multiple rectifying units, and multiple inversion units. One end of the generator is connected to the gas turbine engine, the other end of the generator is connected to the rectifying units. The multiple rectifying units are arranged side by side. The rectifying units and the inversion units are connected through a common DC bus. The generator is a double-winding generator.

In some embodiments, the gas turbine generator set is loaded on a semi-trailer, and the inversion units are disposed on a gooseneck of the semi-trailer body.

In some embodiments, electrically-driven fracturing systems are loaded on semi-trailers, and there are two electric motors and two plunger pumps in the electrically-driven fracturing system loaded on each semi-trailer, and each electric motor drives one plunger pump.

In some embodiments, the power of the plunger pump is 5000 hp or above, and its stroke is 10 inches or above.

In some embodiments, the electrically-driven sand blender each includes a discharge centrifugal pump, a suction centrifugal pump, a first electric motor, and a second electric motor. The first electric motor drives the discharge centrifugal pump, and the second electric motor drives the suction centrifugal pump.

In some embodiments, the first electric motor and the second electric motor are variable frequency integrated electric motors.

In some embodiments, the gas source is at least one of the following: CNG, LNG, wellhead gas, and pipeline gas.

In various embodiments, the disclosed systems and methods have the following beneficial effects. In some embodiments, the gas sources are diverse and not limited, thus better meeting the actual needs of more customers. In some embodiments, in the power supply system, a combination of gas turbine engine, generator, and rectifying units are employed, the generator outputs a winding configuration and a voltage required for the rectifying units directly to obviate conventional rectifier transformer system. In one embodiment, the rectifying units and the inversion units are connected through a common DC bus, so that the common DC bus may separately drive multiple inversion units, thus decreasing the wirings of power supply lines. In one embodiment, a high voltage inversion unit is disposed on a gooseneck of the electrically-driven semi-trailer to optimize the spatial arrangement of system. In one embodiment, the entire power supply system has a more compact structure, occupies a small area, and is simple in wiring. In some embodiments, the electrically-driven fracturing system adopts a design of double pumps driven by double electric motors, thereby significantly improving the output power of the fracturing system and better satisfying the usage requirement. In some embodiments, two variable frequency integrated electric motors are used in the electrically-driven sand blender to effectively decrease the configuration of independent frequency conversion cabinet, that is, the overall size of the sand blender is effectively compressed so that the system transportation and wellsite layout could be more flexible and convenient. Further, the two electric motors drive the discharge centrifugal pump and other components of the sand blender other than the discharge centrifugal pump, effectively optimizing the configuration of the electric motor and the configuration of power system of the sand blender.

The present disclosure will be described in detail below with reference to the accompanying drawings and specific implementations.

Labels in the various drawings include the following: 1. natural gas port, 2. power supply system, 3. electrically-driven fracturing system, 4. electrically-driven sand blender, 5. sand-transporting vehicle, 6. sand storage tank, 7. sand conveyor, 8. chemical additive system, 9. liquid storage tank, 10. instrumentation system, 11. high-low pressure manifold, 12. power supply semi-trailer body, 13. gas turbine engine, 14. generator, 15. rectifying unit, 16. semi-trailer body, 17. plunger pump, 18. radiator, 19. electrical control cabinet, 20. fracturing electric motor, 21. fracturing inversion unit, 22. first electric motor, 23. second electric motor, 24. discharge centrifugal pump, 25. suction centrifugal pump, 26. mixing tank, 27. dry additive system, 28. liquid additive system, 29. sand auger system, 30. blending system, 31. wellhead, 32. natural gas processing system, 33. common DC bus, 34. gooseneck, 35. input end, 36. sand supply system, 37. liquid supply system.

DETAILED DESCRIPTION

Figure 1:
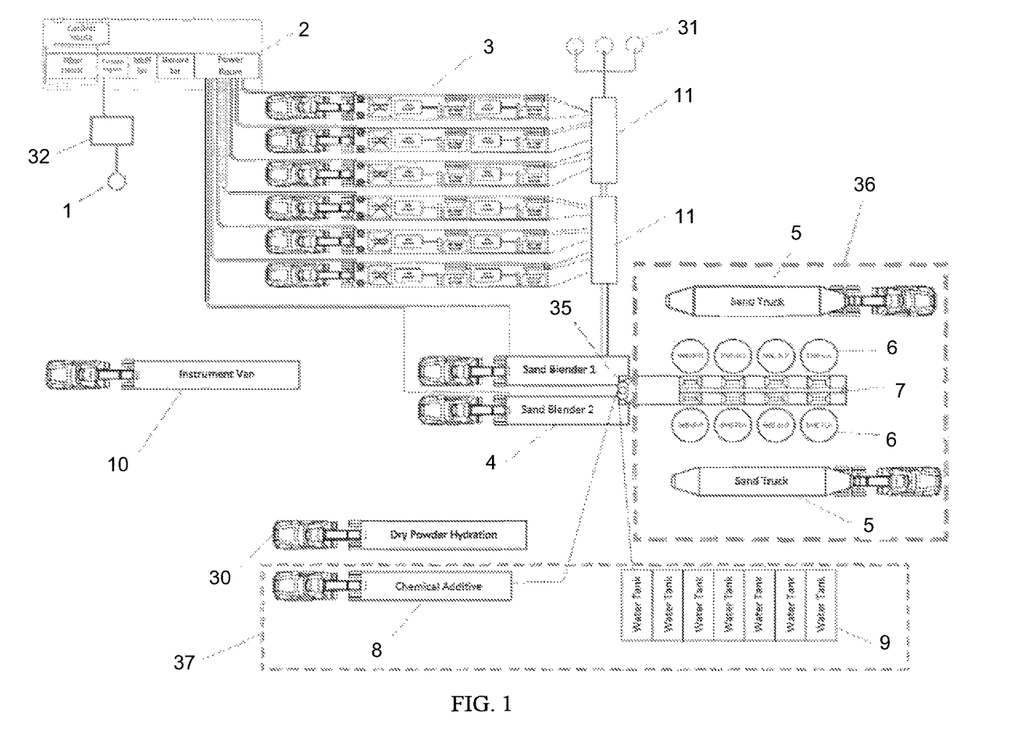
FIG. 1 is a schematic structural diagram of a wellsite system for electrically-driven fracturing, according to some embodiments of the present disclosure.

As shown in FIG. 1, in some embodiments, a wellsite system for electrically-driven fracturing, including a gas source providing gas from natural gas port 1, a power supply system 2, one or more electrically-driven fracturing systems 3, one or more electrically-driven sand blenders 4, a sand supply system 36, a liquid supply system 37, an instrumentation system 10, and one or more high-low pressure manifolds 11. The power supply system 2 is a gas turbine generator set, in which natural gas is used instead of diesel to realize the central supply of electric power. The gas source provides fuel for the gas turbine generator set, the gas turbine generator set provides power for the electrically-driven fracturing systems 3 and the electrically-driven sand blenders 4 respectively. The sand supply system 36 and the liquid supply system 37 are both connected to input ends of the electrically-driven sand blenders 4. Output end of the electrically-driven sand blenders 4 are connected to the electrically-driven fracturing systems 3 through one high-low pressure manifold 11. The electrically-driven fracturing systems 3 are connected to a wellhead 31 through the one or more high-low pressure manifolds 11. The instrumentation system 10 is used for remote control of the electrically-driven fracturing systems 3 and the electrically-driven sand blenders 4. Compared with traditional fracturing mode driven by diesel engine, the entire wellsite system has a lower fuel cost, occupies a smaller area, has a higher power density, a higher output power, and a low noise level. The sand supply system 36 includes one or more sand-transporting vehicles 5, one or more sand storage tanks 6, and one or more sand conveyors 7. The liquid supply system 37 includes one or more chemical additive systems 8, one or more blending systems 30, and one or more liquid storage tanks 9.

Figure 2:
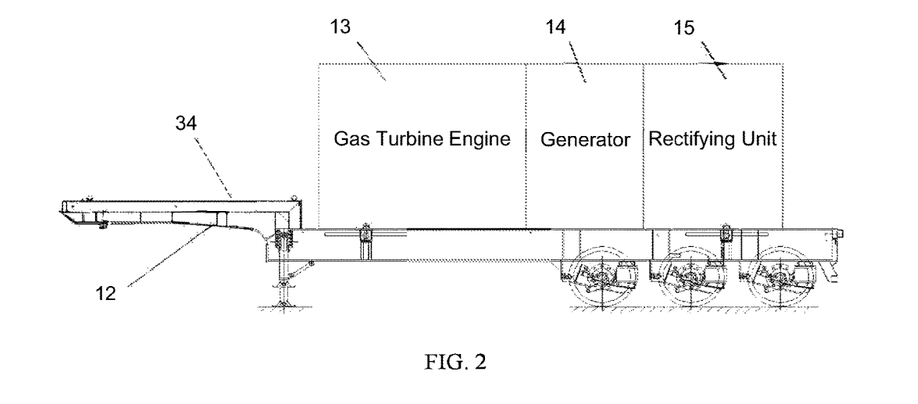
FIG. 2 is a schematic structural diagram of a power supply system, according to some embodiments of the present disclosure.

In some embodiments, the gas turbine generator set includes a gas turbine engine 13, a generator 14, multiple rectifying units 15 (alternatively referred to as rectifiers 15), and multiple inversion units (alternatively referred to as inverter 15). One end of the generator 14 is connected to the gas turbine engine 13, and the other end of the generator 14 is connected to the rectifying units 15. The multiple rectifying units 15 are arranged side by side. The rectifying units 15 and the inversion units are connected through a common DC bus, and the generator 14 is a double-winding generator. The gas turbine generator set is loaded on a semi-trailer, the power supply inversion units are disposed on a gooseneck of the power supply semi-trailer body 12. The power of the generator 14 is not lower than 30 MW. In one embodiment, a combination of one gas turbine engine 13, one generator 14, and multiple rectifying units 15 is employed, the generator 14 directly outputs a winding configuration and a voltage required by the rectifying units 15, obviating the conventional rectifier transformer system. The rectifying units 15 and the inversion unit are connected through a common DC bus, so that the common DC bus can separately drive multiple inversion units, thus reducing the wirings of power supply lines. Power supply inversion units are disposed on a gooseneck of the power supply semi-trailer body 12 to optimize the spatial arrangement of system. The entire power supply system has a more compact structure, occupies a small area, and is simple in wiring.

Figure 5:
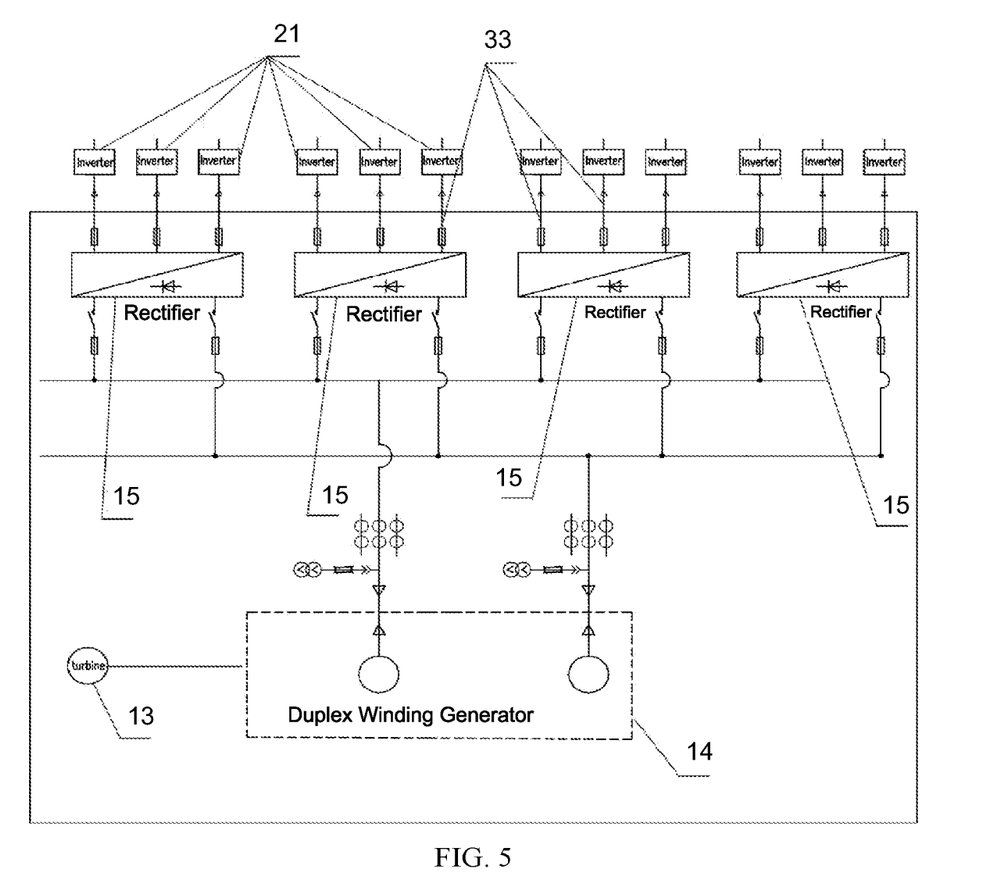
FIG. 5 is a schematic diagram of electrical connection, according to some embodiments of the present disclosure.

In some embodiments, the generator 14 and rectifying units 15 are highly integrated on a power supply semi-trailer body 12, which, after rectification, outputs a DC voltage onto the one or more electrically-driven fracturing systems 3. The DC voltage is inverted by the inversion units on the one or more electrically-driven fracturing systems 3 to drive the electric motor directly, saving the investment on transformer system, and achieving a result of having a single power supply semi-trailer drive at least three electrically-driven fracturing semi-trailers. Since there is no need for transformers, the occupied area and weight of a complete set of fracturing system as well as the investment cost of the system are further reduced.

Figure 3:
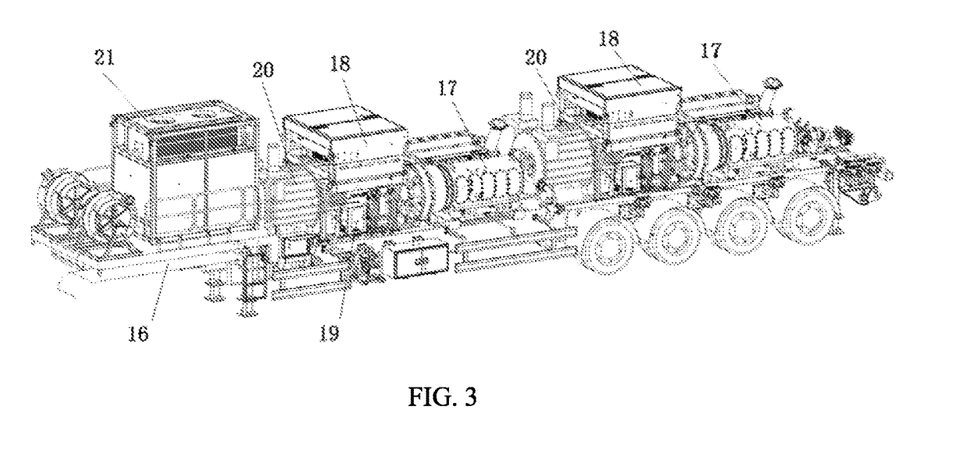
FIG. 3 is a schematic structural diagram of an electrically-driven fracturing system, according to some embodiments of the present disclosure.

In some embodiments, the electrically-driven fracturing systems 3 may each be loaded on a semi-trailer. There may be two electric motors and two plunger pumps 17 in the electrically-driven fracturing system 3 loaded on each semi-trailer, and each electric motor drives one plunger pump 17. The plunger pump 17 is driven by an electric motor, instead of being driven by an engine and a transmission box. A design of double plunger pumps driven by double electric motors is adopted on each semi-trailer, significantly improving the power density of single system, reducing the wellsite layout difficulty, and improving the transportation convenience. The power of the plunger pump 17 is 5000 hp or above, its stroke is 10 inches or above, thus greatly improving the output power of the entire electrically-driven fracturing system 3, so as to better satisfy usage requirement.

Figure 4:
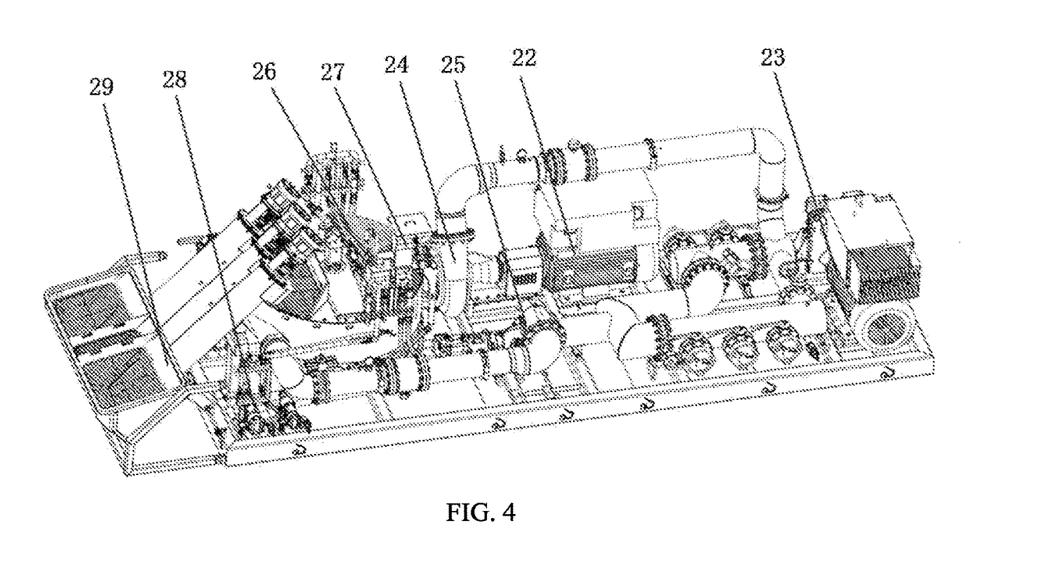
FIG. 4 is a schematic structural diagram of an electrically-driven sand blender, according to some embodiments of the present disclosure.

In some embodiments, the electrically-driven sand blenders 4 each includes a discharge centrifugal pump 24, a suction centrifugal pump 25, a first electric motor 22, and a second electric motor 23, the first electric motor 22 drives the discharge centrifugal pump 24, and the second electric motor 23 drives the suction centrifugal pump 25. The discharge centrifugal pump 24 of the electrically-driven sand blender 4 is directly driven by one electric motor to improve the liquid supply pressure and displacement of the electrically-driven sand blender 4.

In some embodiments, the first electric motor 22 and the second electric motor 23 are variable frequency integrated electric motors.

In some embodiments, the electrically-driven sand blenders 4 are loaded on semi-trailers.

In some embodiments, the gas source includes at least one of the following: CNG (compressed natural gas), LNG (liquefied natural gas), wellhead natural gas, and pipeline natural gas. The gas sources are diverse and not limited, thus better meeting the actual needs of more customers. The CNG, LNG, wellhead gas, and/or pipeline gas is accessed through the natural gas port 1, processed by the natural gas processing system 32, and then delivered to the power supply system 2.

FIG. 2 is a schematic structural diagram of a power supply system. In some embodiments, the gas turbine generator set is loaded on a semi-trailer, which is referred as a gas power supply semi-trailer for short below. The gas power supply semi-trailer includes a power supply semi-trailer body 12, a gas turbine engine 13, a generator 14, a rectifying unit 15, and a power supply inversion unit. The gas turbine engine 13, the generator 14, and the rectifying unit 15 are integrated on the power supply semi-trailer body 12. In one embodiment, there is one gas turbine engine 13, one generator 14, and multiple sets of rectifying units 15. One end of the generator 14 is connected to the gas turbine engine 13, the other end of the generator 14 is connected to the rectifying units 15, and the multiple sets of rectifying units 15 are arranged side by side. Power supply inversion units are disposed on a gooseneck 34 of the power supply semi-trailer body 12. In one embodiment, there are multiple sets of power supply inversion units, the rectifying units 15 and the power supply inversion units are connected through a common DC bus. The generator 14 is a double-winding generator. The generator 14 outputs a winding configuration and a voltage required for the rectifying units 15. The phase difference of double winding of the generator 14 is 30°, and the winding configuration is type Y-Y or type D-D. The alternating voltage output from the generator 14 ranges from 1600 VAC to 2300 VAC.

In some embodiments, the power of the generator 14 is 10 MVA or above, the frequency is 50-60 Hz or 100-120 Hz, and the voltage of the rectifying unit 15 is 4000 VDC or above, and further the voltage of the rectifying unit 15 ranges from 4000 VDC to 6500 VDC, ensuring that the gas power supply semi-trailer has a high output power to drive one or more high-power electrically-driven fracturing systems 3.

FIG. 3 is a schematic structural diagram of an electrically-driven fracturing system. In some embodiments, the electrically-driven fracturing systems 3 are loaded on semi-trailers. Each semi-trailer loaded with an electrically-driven fracturing system 3 is referred as an electrically-driven fracturing semi-trailer for short below. Each electrically-driven fracturing semi-trailer includes a semi-trailer body 16, a plunger pump 17, a radiator 18, an electrical control cabinet 19, a fracturing electric motor 20, and a fracturing inversion unit 21, wherein the plunger pump 17, the radiator 18, the electrical control cabinet 19, the fracturing electric motor 20, and the fracturing inversion unit 21 are integrated on the semi-trailer body 16. The number of axles of the semi-trailer body 16 is 4 or above. The fracturing inversion unit 21 is disposed on a gooseneck of the semi-trailer body 16, one end of the fracturing electric motor 20 is connected to the fracturing inversion unit 21, and the other end of the fracturing electric motor 20 is connected to the plunger pump 17. The radiator 18 cools the lubricating oil of the plunger pump 17. The electrical control cabinet 19 is used to implement local manipulation of the electrically-driven fracturing semi-trailer. In some embodiments, there are two fracturing electric motors 20, two plunger pumps 17, and two radiators 18 in an electrically-driven fracturing system as show in FIG. 3. The electrically-driven fracturing semi-trailer may be properly provided with fracturing electric motors 20 and plunger pumps 17, so that there are two fracturing electric motors 20 and two plunger pumps 17 mounted on each semi-trailer. The plunger pump 17 is a five-cylinder plunger pump with a stroke of 10 inches or above, the total power of double pumps can up to 10000 hp. The plunger pumps 17 are driven by the fracturing electric motors 20 instead of an engine and a transmission box. More than one electrically-driven fracturing semi-trailer can be arranged as needed in a fracturing site.

FIG. 4 is a schematic structural diagram of an electrically-driven sand blender. In some embodiments, the electrically-driven sand blenders 4 are loaded on semi-trailers. The semi-trailers loaded with electrically-driven sand blenders 4 are referred as electrically-driven sand-blending semi-trailers for short below. FIG. 4 shows a schematic structural diagram of the loading components of the electrically-driven sand blenders 4 after removing the semi-trailer. More than one electrically-driven sand-blending semi-trailers may be arranged in the wellsite system. Some of the electrically-driven sand-blending semi-trailers may be in a working state and some of them may stand by, ensuring an uninterrupted sand-blending field operation. The electrically-driven sand-blending semi-trailers each include a sand-blending semi-trailer body, a sand-blending electric motor, a hydraulic pump, a discharge centrifugal pump 24, a suction centrifugal pump 25, a mixing tank 26, a dry additive system 27, a suction manifold, a discharge manifold, a liquid additive system 28 and a sand auger system 29, wherein the sand-blending electric motor, the hydraulic pump, the discharge centrifugal pump 24, the suction centrifugal pump 25, the mixing tank 26, the dry additive system 27, the suction manifold, the discharge manifold, the liquid additive system 28, and the sand auger system 29 are integrated on the sand-blending semi-trailer body. In one embodiment, there are two sand-blending electric motors, including a first electric motor 22 and a second electric motor 23. The first electric motor 22 is used to directly drive the discharge centrifugal pump 24, which conveniently and effectively enhances the input power of the discharge centrifugal pump 24, further improving the operation capability of the system. The second electric motor 23 drives the hydraulic pump through a transfer case, and further drives the suction centrifugal pump 25, the mixing tank 26, the dry additive system 27, the liquid additive system 28, and the sand auger system 29. The sand-blending electric motor is a variable frequency integrated electric motor. A variable frequency integrated electric motor (that is, integrating an inversion function on the electric motor) is used to prevent the problem of complex structure and large occupied area of the diesel engine system, and meanwhile reduce the configuration of independent frequency conversion cabinet. In one embodiment, two variable frequency integrated electric motors are used to control all components of the entire electrically-driven sand blender 4, so that the control system becomes more concise. During operations, the second electric motor 23 which drives the hydraulic pump may be set to a constant speed directly, such that only the speed of each functional component needs to be adjusted as necessary in the process of operation to achieve the control purpose.

In some embodiments, the liquid storage tank 9 provides water for the blending system 30, which blends the water and various additives to form a fracturing base fluid. The fracturing base fluid is supplied to the electrically-driven sand blender 4. The sand-transporting vehicle 5 transports fracturing proppants to the wellsite, which are then conveyed into the sand storage tank 6. There may be multiple sand-transporting vehicles 5. The fracturing proppants are conveyed through a sand conveyor 7 from the sand storage tank 6 to the electrically-driven sand blender 4. The fracturing base fluid and the fracturing proppants are mixed in the electrically-driven sand blender 4 and conveyed into the high-low pressure manifold 11, then distributed to each electrically-driven fracturing semi-trailer through the high-low pressure manifold 11. The electrically-driven fracturing semi-trailer injects the mixed fracturing fluid into the wellhead 31 by a high-pressure pump (the injection path being: the electrically-driven fracturing semi-trailer to the connection pipeline to the high-low pressure manifold 11 to the wellhead 31), and then the stratum of the oil well or gas well is fractured. The chemical additive system 8 is used to supply various chemical additives to the blending system 30 or the electrically-driven sand blender 4.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

The invention claimed is:

1. A wellsite system for electrically-driven fracturing, comprising:
   a power supply system, one or more electrically-driven fracturing systems, one or more electrically-driven sand blenders, a sand supply system, a liquid supply system, and one or more manifolds, wherein:
   the power supply system is configured to provide power to the one or more electrically-driven fracturing systems and the one or more electrically-driven sand blenders respectively;
   the sand supply system and the liquid supply system are both connected to one or more input ends of the one or more electrically-driven sand blenders;
   one or more output ends of the one or more electrically-driven sand blenders are connected to the one or more electrically-driven fracturing systems through the one or more manifolds; and
   the one or more electrically-driven fracturing systems are connected to a wellhead through the one or more manifolds,
   wherein the power supply system comprises a gas turbine engine, a generator, and at least one rectifier, wherein a first end of the generator is connected to the gas turbine engine, and a second end of the generator is connected to the at least one rectifier, and
   wherein each of the one or more electrically-driven sand blenders comprises a first and a second electric motor; the first electric motor is configured to drive a discharge centrifugal pump;
the second electric motor is configured to drive a hydraulic pump, and the hydraulic pump drives a suction centrifugal pump and a sand auger.

2. The wellsite system for electrically-driven fracturing according to claim 1, wherein the sand supply system comprises a sanding vehicle, a sand storage tank, and a sand conveyor.

3. The wellsite system for electrically-driven fracturing according to claim 1, wherein the liquid supply system comprises a chemical additive system, a blending system, and a liquid storage tank.

4. The wellsite system for electrically-driven fracturing according to claim 1, further comprising:
   an instrumentation system configured to remotely control the one or more electrically-driven fracturing systems and the one or more electrically-driven sand blenders.

5. The wellsite system for electrically-driven fracturing according to claim 1, wherein the one or more manifolds comprise a high-and-low pressure manifold.

6. The wellsite system for electrically-driven fracturing according to claim 1, further comprising a gas source configured to provide fuel to the gas turbine engine, wherein the fuel comprises CNG (compressed natural gas), LNG (liquefied natural gas), wellhead gas, or pipeline gas.

7. The wellsite system for electrically-driven fracturing according to claim 1, wherein:
   the one or more electrically-driven fracturing systems comprise at least three electrically-driven fracturing systems; and
   the power supply system comprises a power supply semi-trailer configured to drive the at least three electrically-driven fracturing systems.

8. The wellsite system for electrically-driven fracturing according to claim 1, wherein the generator is a double-winding generator.

9. The wellsite system for electrically-driven fracturing according to claim 1, wherein the generator has a phase difference of double winding of 30°.

10. The wellsite system for electrically-driven fracturing according to claim 1, wherein the generator is configured to output an alternating voltage ranging from 1600 VAC to 2300 VAC.

11. The wellsite system for electrically-driven fracturing according to claim 1, wherein the power supply system further comprises at least one inverter, and the at least one rectifier and the at least one inverter are connected through a common DC bus.

12. The wellsite system for electrically-driven fracturing according to claim 1, wherein:
   each of the one or more electrically-driven fracturing systems is loaded on a semi-trailer and includes at least two electric motors and at least two plunger pumps; and
   the at least two electric motors are configured to respectively drive the at least two plunger pumps.

13. The wellsite system for electrically-driven fracturing according to claim 12, wherein each of the at least two plunger pumps has a power of at least 5000 hp and a stroke of at least 10 inches.

14. A wellsite system for electrically-driven fracturing, comprising:
   a power supply system, one or more electrically-driven fracturing systems, one or more electrically-driven sand blenders, a sand supply system, a liquid supply system, and one or more manifolds, wherein:
   the power supply system includes a gas turbine generator set configured to provide power to the one or more electrically-driven fracturing systems and the one or more electrically-driven sand blenders;
   the sand supply system and the liquid supply system are both connected to one or more input ends of the one or more electrically-driven sand blenders;
   one or more output ends of the one or more electrically-driven sand blenders are connected to the one or more electrically-driven fracturing systems through the one or more manifolds;
   the one or more electrically-driven fracturing systems are connected to a wellhead through the one or more manifolds; and the gas turbine generator set is loaded on a semi-trailer, and multiple inverter units are disposed on a gooseneck of the semi-trailer.

15. The wellsite system for electrically-driven fracturing according to claim 14, wherein the gas turbine generator set comprises a gas turbine engine, a generator, and at least one rectifier.

16. A wellsite system for electrically-driven fracturing, comprising:
a power supply system, one or more electrically-driven fracturing systems, one or more electrically-driven sand blenders, a sand supply system, a liquid supply system, and one or more manifolds, wherein:
the power supply system includes a gas turbine generator set configured to provide power to the one or more electrically-driven fracturing systems and the one or more electrically-driven sand blenders;
the sand supply system and the liquid supply system are both connected to one or more input ends of the one or more electrically-driven sand blenders;
one or more output ends of the one or more electrically-driven sand blenders are connected to the one or more electrically-driven fracturing systems through the one or more manifolds; and
the one or more electrically-driven fracturing systems are connected to a wellhead through the one or more manifolds, wherein:
each of the one or more electrically-driven sand blenders comprises a discharge centrifugal pump, a suction centrifugal pump, a first electric motor, and a second electric motor;
the first electric motor is configured to drive the discharge centrifugal pump; and
the second electric motor is configured to drive the suction centrifugal pump,
wherein the first electric motor and the second electric motor are variable frequency integrated electric motors.

17. The wellsite system for electrically-driven fracturing according to claim 16, wherein the one or more electrically-driven sand blenders are loaded on one or more semi-trailers.

18. The wellsite system for electrically-driven fracturing according to claim 16, wherein the sand supply system comprises a sanding vehicle, a sand storage tank, and a sand conveyor.

19. The wellsite system for electrically-driven fracturing according to claim 16, wherein the liquid supply system comprises a chemical additive system, a blending system, and a liquid storage tank.

20. The wellsite system for electrically-driven fracturing according to claim 16, further comprising:
an instrumentation system configured to remotely control the one or more electrically-driven fracturing systems and the one or more electrically-driven sand blenders.

* * * * *